United States Patent
Liu et al.

(10) Patent No.: US 12,553,107 B2
(45) Date of Patent: Feb. 17, 2026

(54) METHOD FOR CATALYST RECOVERY FROM CATALYST-COATED MEMBRANES

(71) Applicant: UOP LLC, Des Plaines, IL (US)

(72) Inventors: Chunqing Liu, Arlington Heights, IL (US); Zhihao Shang, Mount Prospect, IL (US)

(73) Assignee: UOP LLC, Des Plaines, IL (US)

( * ) Notice: Subject to any disclaimer, the term of this patent is extended or adjusted under 35 U.S.C. 154(b) by 364 days.

(21) Appl. No.: 18/451,327

(22) Filed: Aug. 17, 2023

(65) Prior Publication Data

US 2025/0059620 A1    Feb. 20, 2025

(51) Int. Cl.
| | | |
|---|---|---|
| *C22B 11/00* | (2006.01) | |
| *B09B 3/40* | (2022.01) | |
| *B09B 3/70* | (2022.01) | |
| *C22B 3/22* | (2006.01) | |
| *C22B 7/00* | (2006.01) | |

(Continued)

(52) U.S. Cl.
CPC ............. *C22B 11/048* (2013.01); *B09B 3/40* (2022.01); *B09B 3/70* (2022.01); *C22B 3/22* (2013.01); *C22B 7/008* (2013.01); *B09B 2101/77* (2022.01); *B09B 2101/95* (2022.01); *Y02E 60/50* (2013.01); *Y02W 30/84* (2015.05)

(58) Field of Classification Search
CPC ......... C22B 11/048; C22B 7/008; C22B 3/22; B09B 3/40; B09B 3/70; B09B 2101/77; B09B 2101/95
See application file for complete search history.

(56) References Cited

U.S. PATENT DOCUMENTS

| | | | |
|---|---|---|---|
| 4,069,040 A | 1/1978 | Thomas et al. | |
| 7,255,798 B2 * | 8/2007 | Grot ...................... | H01M 8/008 |
| | | | 588/407 |

(Continued)

FOREIGN PATENT DOCUMENTS

| | | |
|---|---|---|
| CN | 101280362 A | 10/2008 |
| JP | 2006207003 A | 8/2006 |
| KR | 101509086 B1 | 4/2015 |

OTHER PUBLICATIONS

Valente et al. End of Life of fuel cells and hydrogen products: From technologies to strategies. International Journal of Hydrogen Energy vol. 44, Issue 38, pp. 20965-20977 (Year: 2019).*

(Continued)

*Primary Examiner* — Alexandra M Moore

(57) ABSTRACT

A method for recycling anode and/or cathode catalyst from the catalyst coated membranes comprising proton exchange membrane, a continuous nonporous cross-linked polyelectrolyte multilayer coating comprising alternating layers of a polycation polymer and a polyanion polymer, an anode coating layer comprising anode catalyst particles, a cathode coating layer comprising cathode catalyst particles, and optionally a second continuous nonporous cross-linked polyelectrolyte multilayer coating between the second surface of the proton exchange membrane and the cathode coating layer. The cross-linked polyelectrolyte multilayer coating between the proton exchange membrane and the anode and/or cathode catalyst coating layer is dissolved in an aqueous solution with a pH of greater than 7. The catalyst coated membrane is delaminated, and the anode and/or cathode catalyst is recovered.

20 Claims, 3 Drawing Sheets

(51) Int. Cl.
   *B09B 101/77*      (2022.01)
   *B09B 101/95*      (2022.01)

(56) References Cited

U.S. PATENT DOCUMENTS

2007/0292745 A1   12/2007   Shore
2023/0250545 A1   8/2023    van der Vliet et al.

OTHER PUBLICATIONS

Bharti and Natarajan. Recovery of expensive Pt/C catalysts from the end-of-life membrane electrode assembly of proton exchange membrane fuel cells. RSC Advances. https://doi.org/10.1039/D0RA06640K (Year: 2020).*

Haque, N., Giddey, S., Saha, S., Sernia, P. Recyclability of Proton Exchange Membrane Electrolysers for Green Hydrogen Production. In: Reddy, R.G., et al. New Directions in Mineral Processing, Extractive Metallurgy, Recycling and Waste Minimization. https://doi.org/10.1007/978-3-031-22765-3_14 (Year: 2023).*

International Search Report from corresponding PCT application No. PCT/US2024/041674, mailed Nov. 14, 2024.

Written Opinion from corresponding PCT application No. PCT/US2024/041674, mailed Nov. 14, 2024.

Thi Hong Nguyen et al., Separation of Pt(IV), PD(II), Rh(III) and IR(IV) from concentrated hydrochloric acid solutions by solvent extraction, Hydrometallurgy 164 (2016) 71-77.

Xiaolu Yin et al., Extraction and separation of multiple platinum group metals from hydrochloric acid solution with sole 1-hexyl-3-methylimidazole-2-thione using microextraction method, Hydrometallurgy 174 (2017) 167-174.

Yan Yan et al., Behavior and mechanism investigation of separating Pt and Ir by liquid-liquid extraction using a mixed [C6bet]Br/[C6mim][NTF2] system, New J. Chem., 2017, 41, 8985.

Steffen Kiemel et al., Critical materials for water electrolysers at the example of the energy transition in Germany, Int J Energy Res., 2021; 45; 9914-9935.

* cited by examiner

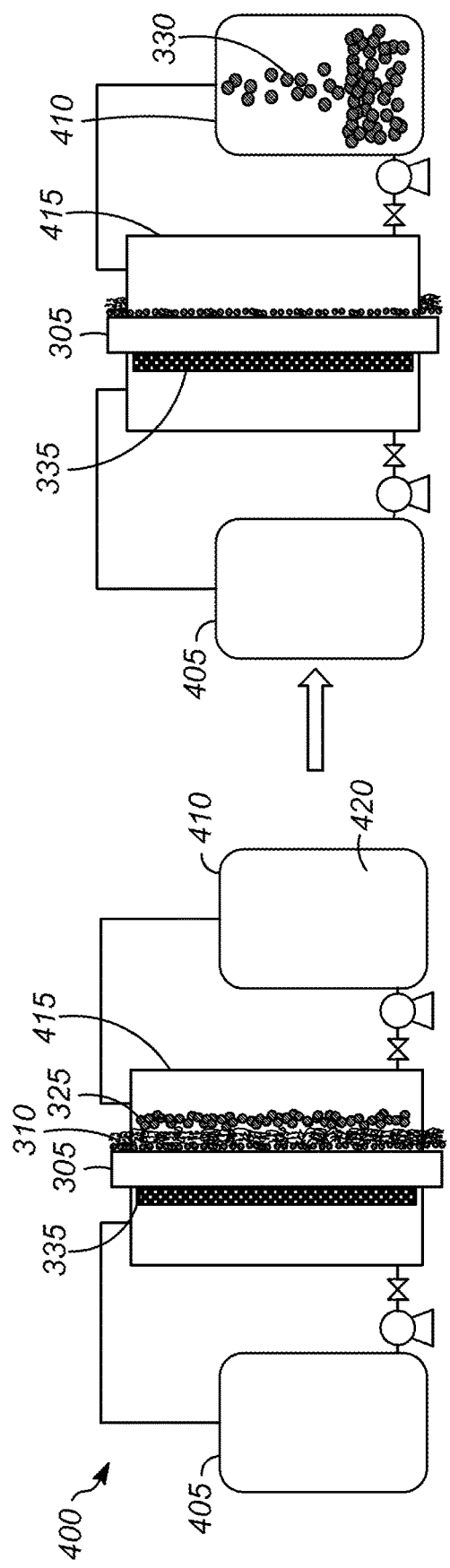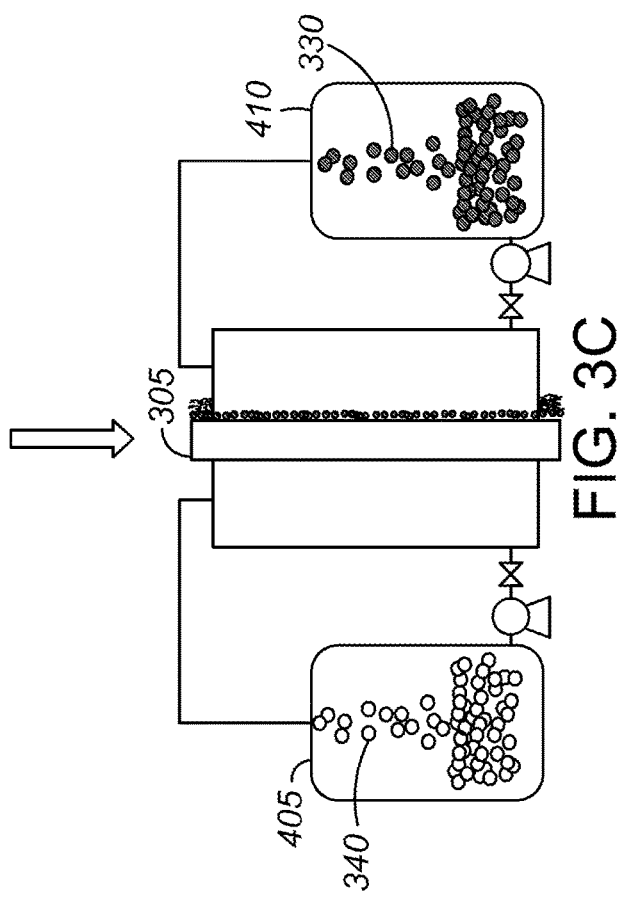

METHOD FOR CATALYST RECOVERY FROM CATALYST-COATED MEMBRANES

BACKGROUND

Hydrogen as an energy vector for grid balancing or power-to-gas and power-to-liquid processes plays an important role in the path toward a low-carbon energy structure that is environmentally friendly. Water electrolysis produces high quality hydrogen by electrochemical splitting of water into hydrogen and oxygen; the reaction is given by Eq. 1 below. The water electrolysis process is an endothermic process and electricity is the energy source. Water electrolysis has zero carbon footprint when the process is operated by renewable power sources, such as wind, solar, or geothermal energy. The main water electrolysis technologies include alkaline electrolysis, proton exchange membrane (PEM) water electrolysis (PEM-WE as shown in FIG. 1), anion exchange membrane (AEM) water electrolysis (AEM-WE as shown in FIG. 2), and solid oxide water electrolysis.

As shown in FIG. 1, in a PEM-WE system 100, an anode 105 and a cathode 110 are separated by a solid PEM electrolyte 115, such as a sulfonated tetrafluoroethylene based cofluoropolymer sold under the trademark Nafion® by Chemours company. The anode and cathode catalysts typically comprise $IrO_2$ and Pt, respectively. At the positively charged anode 105, pure water 120 is oxidized to produce oxygen gas 125, electrons (e−), and protons; the reaction is given by Eq. 2. The protons are transported from the anode 105 to the cathode 110 through the PEM 115 that conducts protons. At the negatively charged cathode 110, a reduction reaction takes place with electrons from the cathode 110 being given to protons to form hydrogen gas 130; the reaction is given by Eq. 3. The PEM 115 not only conducts protons from the anode 105 to the cathode 110, but also separates the H2 gas 130 and O2 gas 125 produced in the water electrolysis reaction. PEM water electrolysis is one of the favorable methods for conversion of renewable energy to high purity hydrogen with the advantage of compact system design at high differential pressures, high current density, high efficiency, fast response, small footprint, lower temperature (20-90° C.) operation, and high purity oxygen byproduct. However, one of the major challenges for PEM water electrolysis is the high capital cost of the cell stack comprising expensive acid-tolerant stack hardware such as the Pt-coated Ti bipolar plates, expensive noble metal catalysts required for the electrodes, as well as the expensive PEM.

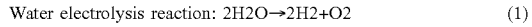

Water electrolysis reaction: $2H_2O \rightarrow 2H_2 + O_2$ (1)

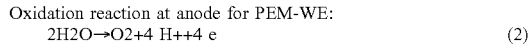

Oxidation reaction at anode for PEM-WE:
$2H_2O \rightarrow O_2 + 4H^+ + 4e$ (2)

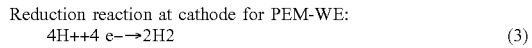

Reduction reaction at cathode for PEM-WE:
$4H^+ + 4e^- \rightarrow 2H_2$ (3)

In the PEM-WE and AEM-WE systems, several components are integrated to produce green H2, including current collector plates, bipolar plates (BPs), two porous transport layers (PTL), a three-layer membrane electrode assembly (MEA) or called catalyst-coated membrane (CCM) consisting of a membrane, an anode layer, and a cathode layer. Among the main components, CCM is the most important one as the electrochemical water electrolysis reaction occurs in the CCM.

The anode in the CCM for an electrochemical cell coated on one surface of the membrane is the electrode at which the predominant reaction is oxidation (e.g., the water oxidation/oxygen evolution reaction electrode for a water electrolyzer). The cathode in the CCM for an electrochemical cell coated on the other surface of the membrane is the electrode at which the predominant reaction is reduction (e.g., the proton reduction/hydrogen evolution reaction electrode for a water electrolyzer). Both anode and cathode are key components in the CCM. Typically, unsupported or supported iridium (Ir) based scarce platinum group electrocatalysts are used for the oxygen evolution reaction (OER) on the anode and carbon supported platinum electrocatalyst (Pt/C) is used for the hydrogen evolution reaction (HER) on the cathode for PEM-WE. Both Ir and Pt based platinum group metal (PGM) catalyst are very expensive and scarce. Significant reduction of the PGM catalyst loading on the catalyst coating layer will be required with the increase of the GW-scale PEM-WE installation projects. Not only methods for reducing the loading of the PGM catalysts but also methods for recycling the PGM catalysts are important to the improved market penetration of PEM-WE technology for green H2 production.

Significant advances are needed in finding cost-effective and sustainable PGM recovery methods for used CCMs.

BRIEF DESCRIPTION OF THE DRAWINGS

FIGS. 3A-3C are illustrations of embodiments of the method of recovering catalyst from a catalyst coated membrane.

DESCRIPTION

Figure 1:
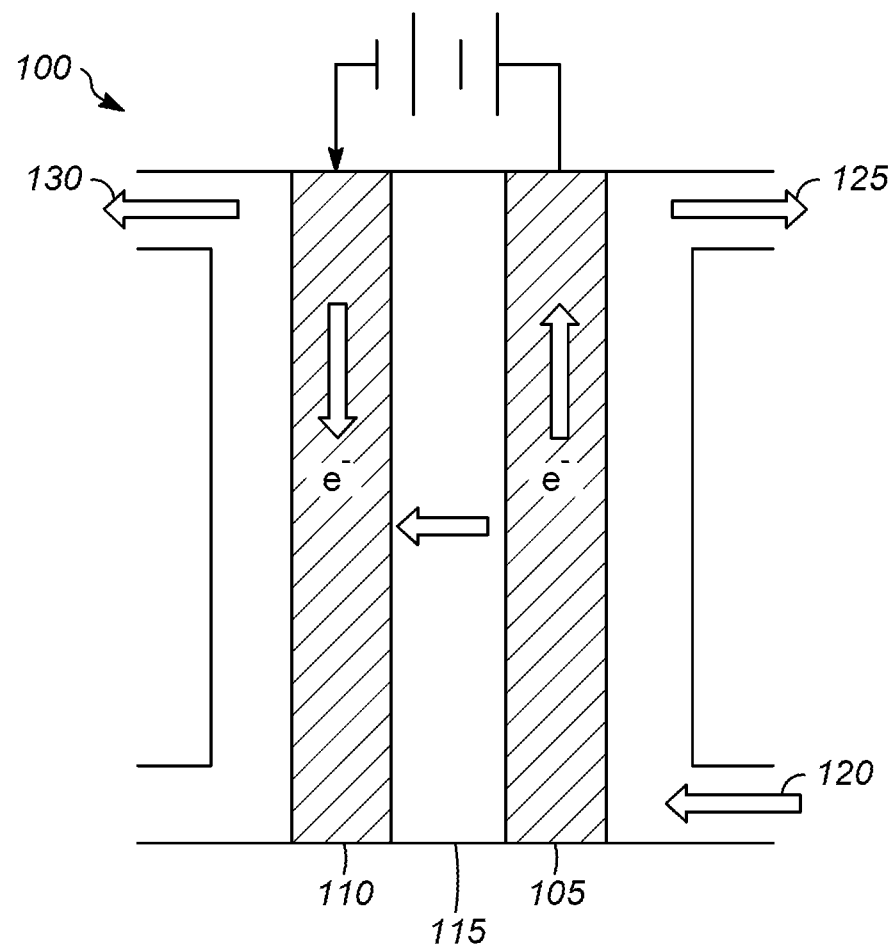
FIG. 1 is an illustration of one embodiment of a PEMWE cell.

The present invention relates to an innovative and simple method of recovering the PGM catalysts, particularly Ir-comprising anode catalysts, from the used catalyst coated membranes (CCMs) for PEM-WE. The present catalyst recovering method can be used to recover and recycle the PGM catalyst from the PEM electrolyzer stacks comprising the CCMs. The present catalyst recovering method is particularly suitable for the anode catalyst recovery from the CCMs for PEM-WE described in U.S. patent application Ser. No. 17/451,227, filed on Oct. 18, 2021, entitled Polyelectrolyte Multilayer Coated Proton Exchange Membrane for Electrolysis and Fuel Cell Applications, which is incorporated herein by reference in its entirety and the CCMs for PEM-WE described in U.S. Provisional Patent Application No. 63/476,983, filed on Dec. 23, 2022, entitled Multilayer Ion-Exchange Membrane for Electrolysis Applications, which is incorporated herein by reference in its entirety, for example.

The current catalyst recycling method is different from the conventional incineration method that will release highly toxic and corrosive hydrogen fluoride (HF) gas. The present method recycles anode and/or cathode catalyst, such as $IrO_2$ anode catalyst from the CCMs comprising a proton exchange membrane having a first surface and a second surface, a first continuous nonporous cross-linked polyelectrolyte multilayer coating on the first surface of the proton exchange membrane, the first continuous polyelectrolyte multilayer coating comprising alternating layers of a polycation polymer and a polyanion polymer, an anode coating layer comprising anode catalyst particles on the continuous nonporous cross-linked polyelectrolyte multilayer coating on the first surface of the proton exchange membrane, a cathode coating layer comprising cathode catalyst particles on the second surface of the proton exchange membrane, and optionally a second continuous nonporous cross-linked polyelectrolyte multilayer coating between the second surface of the proton exchange membrane and the cathode coating layer, by dissolving the cross-linked polyelectrolyte multilayer coating, such as ionically crosslinked sulfonated poly(ether ether ketone) (SPEEK)/poly(allyl amine hydrochloride) (PAH) polyelectrolyte layers, between the proton exchange membrane and the anode and/or cathode catalyst coating layer in an aqueous solution with a pH of greater than 7, such as a 1 M NaOH aqueous solution, delaminating the catalyst coated membrane, and recovering the anode and/or cathode catalyst from the CCM. In addition, the ionically crosslinked polyelectrolytes can be used as the ionomer in the anode and cathode catalyst coating layers. The ionically crosslinked polyelectrolyte ionomer can also be dissolved to facilitate the catalyst recovery.

This method avoids toxic and corrosive gas (HF) formation because it does not involve incineration of the CCM. In addition, it preserves key membrane materials, such as proton exchange membranes and hydrogen recombination layers (if present). The method also has high catalyst recovery yield, and the anode and cathode catalysts may be recovered separately which avoids the necessity of separating the anode and cathode catalysts.

One aspect of the invention is a method for recovering catalyst from a catalyst coated membrane. In one embodiment, the method comprises providing a catalyst coated membrane comprising: a proton exchange membrane, the proton exchange membrane having a first surface and a second surface; a first continuous nonporous cross-linked polyelectrolyte multilayer coating on the first surface of the proton exchange membrane, the first continuous polyelectrolyte multilayer coating comprising alternating layers of a polycation polymer and a polyanion polymer; an anode coating layer comprising anode catalyst particles on the continuous nonporous cross-linked polyelectrolyte multilayer coating on the first surface of the proton exchange membrane; a cathode coating layer comprising cathode catalyst particles on the second surface of the proton exchange membrane; and optionally a second continuous nonporous cross-linked polyelectrolyte multilayer coating between the second surface of the proton exchange membrane and the cathode coating layer. The catalyst coated membrane is contacted with an alkaline solution and the first continuous nonporous cross-linked polyelectrolyte multilayer coating or the first and the second continuous nonporous cross-linked polyelectrolyte multilayer coatings is dissolved. The anode and/or cathode catalyst particles are recovered. If both the anode and cathode catalyst particles are recovered, they are preferably recovered separately.

The pH of the alkaline solution is typically greater than 7, or greater than 8, or greater than 9, or greater than 10, or greater than 11, or greater than 12, or greater than 13.

The catalyst coated membrane can be contacted with the alkaline solution while heating the catalyst coated membrane and/or the alkaline solution, sonicating the catalyst coated membrane and/or the alkaline solution, or heating and sonicating the catalyst coated membrane and/or the alkaline solution. The catalyst coated membrane may be heated at a temperature in a range of 30° C. to 150° C., or in a range of 30° C. to 100° C., or in a range of 50° C. to 150° C., or in a range of 50° C. to 100° C.

The alkaline solution can be added to the anode side of the catalyst coated membrane, or the cathode side, or both the anode side and the cathode side. Alternatively, the catalyst coated membrane can be added to the alkaline solution to recover the catalysts, but in this case, the anode and cathode catalyst particles would be mixed together.

The anode catalyst particles may comprise, but are not limited to, a platinum group metal (PGM), a PGM supported on a different PGM support, a PGM supported on a non-PGM support, an alloy thereof, an oxide thereof, a carbide thereof, a phosphide thereof, or combinations thereof. The term "platinum group metals" means the six noble, precious metallic elements including ruthenium (Ru), rhodium (Rh), palladium (Pd), osmium (Os), iridium (Ir), and platinum (Pt). The anode catalyst particles may comprise, but are not limited to, iridium, iridium supported on a non-PGM support, platinum, platinum supported on a non-PGM support, ruthenium, ruthenium supported on a non-PGM support, osmium, rhodium, palladium, tin, tungsten, vanadium, cobalt, silver, gold, copper, nickel, molybdenum, iron, chromium, alloys thereof, oxides thereof, carbides thereof, phosphides thereof, or combinations thereof. The anode catalyst particles may comprise, but are not limited to, iridium, iridium supported on platinum, iridium supported on a non-PGM support, platinum, platinum supported on a non-PGM support, ruthenium, ruthenium supported on a non-PGM support, oxides thereof, or combinations thereof.

The cathode catalyst particles may comprise, but are not limited to, a platinum group metal (PGM), a PGM supported on a non-PGM support, an alloy thereof, or combinations thereof. The cathode catalyst particles may comprise, but are not limited to, platinum, platinum supported on a non-PGM support, ruthenium, ruthenium supported on a non-PGM support, osmium, rhodium, palladium, tin, tungsten, vanadium, cobalt, silver, gold, nickel, molybdenum, iron, copper, chromium, alloys thereof, carbides thereof, phosphides thereof, or combinations thereof. The cathode catalyst particles may comprise, but are not limited to, platinum, platinum supported on carbon support, platinum supported on graphene support, platinum supported on graphene oxide support, ruthenium, ruthenium supported on carbon support, ruthenium supported on graphene support, ruthenium supported on graphene oxide support, platinum and ruthenium supported on carbon support, or combinations thereof.

The polycation polymer layer of the first continuous nonporous cross-linked polyelectrolyte multilayer coating is in contact with the first surface of the proton exchange membrane. If there is a second continuous nonporous cross-linked polyelectrolyte multilayer coating, the polycation polymer layer of the first continuous nonporous cross-linked polyelectrolyte multilayer coating is in contact with the first surface of the proton exchange membrane and the polycation polymer layer of the second continuous nonporous cross-linked polyelectrolyte multilayer coating is in contact with the second surface of the proton exchange membrane.

Any suitable alkaline solution can be used. Suitable alkaline solutions may comprise, but are not limited to, KOH, NaOH, LiOH, CsOH, KHCO$_3$, K$_2$CO$_3$, LiHCO$_3$, Li$_2$CO$_3$, NaHCO$_3$, Na$_2$CO$_3$, or combinations thereof.

Figure 2:
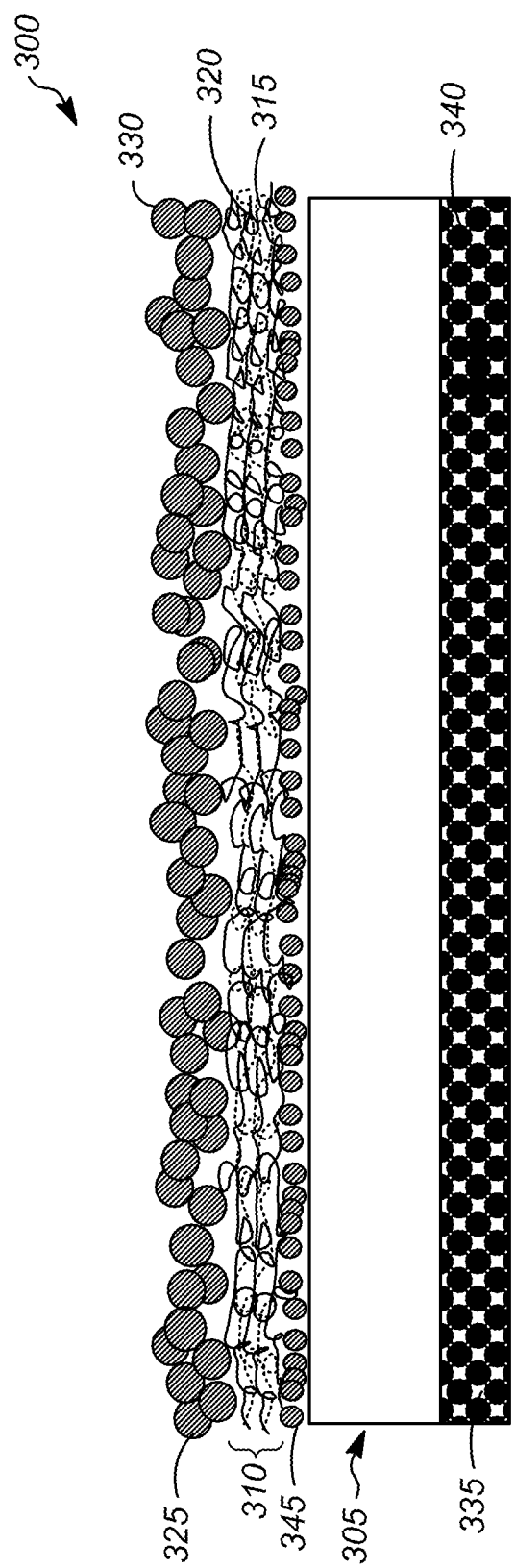
FIG. 2 is an illustration of one embodiment of a catalyst coated membrane of the present invention.

FIG. 2 is an illustration of one embodiment of a catalyst coated membrane 300. The catalyst coated membrane 300 comprises a proton exchange membrane 305. The proton exchange membrane may comprise a cation exchange polymer or a mixture of a cation exchange polymer and an inorganic filler comprising covalently bonded acidic functional groups. The proton exchange membrane 305 comprises —SO$_3^-$, —COO$^-$, —PO$_3^{2-}$, or —PO$_3$H$^-$ cation exchange functional groups with negative ionic charges. The proton exchange polymer may be selected from, but is not limited to, a perfluorinated ionomer such as Nafion®, Flemion®, Fumion®, Aciplex®, or Aquivion®, a cross-linked perfluorinated cation-exchange polymer, a partially fluorinated polymer, a cross-linked partially fluorinated cation-exchange polymer, a non-fluorinated hydrocarbon polymer, a cross-linked non-fluorinated hydrocarbon cation-exchange polymer, or combinations thereof. The proton exchange membrane 305 has high mechanical strength, good chemical and thermal stability, and good proton conductivity. The catalyst coated membrane 300 has low membrane area specific resistance, low swelling, significantly reduced $H_2$ and $O_2$ crossover, and enhanced proton conductivity compared to the proton exchange membrane 305 without the catalyst layer and the polyelectrolyte multilayer coating.

The proton exchange membrane 305 may be a composite proton conductive membrane as described in U.S. patent application Ser. No. 17/162,421, filed on Jan. 29, 2021, entitled Composite Proton Conductive Membranes, which is incorporated herein by reference in its entirety. That application disclosed a new type of composite proton conductive membrane comprising an inorganic filler having covalently bonded acidic functional groups and a high surface area of at least 150 $m^2/g$, and a water insoluble ionically conductive polymer.

The inorganic filler comprising covalently bonded acidic functional groups in the proton exchange membrane 305 may be selected from, but is not limited to, silica gel, precipitated silica, fumed silica, colloidal silica, alumina, silica-alumina, zirconium oxide, molecular sieve, metal-organic framework, zeolitic imidazolate framework, covalent organic framework, or a combination thereof, and wherein the filler may comprise both covalently bonded acidic functional groups and a high surface area of 150 $m^2/g$ or higher, or 300 $m^2/g$ or higher, or 400 $m^2/g$ or higher. Molecular sieves have framework structures which may be characterized by distinctive wide-angle X-ray diffraction patterns. Zeolites are a subclass of molecular sieves based on an aluminosilicate composition. Non-zeolitic molecular sieves are based on other compositions such as aluminophosphates, silico-aluminophosphates, and silica. Molecular sieves can have different chemical compositions and different framework structure. The molecular sieves can be microporous or mesoporous molecular sieves and need to be stable in aqueous solution under pH of less than 6. The acidic functional groups covalently bonded to the inorganic fillers may be selected from, but are not limited to, —$H_2PO_3$, —R—$H_2PO_3$, —$SO_3H$, —R—$SO_3H$, —COOH, —R—COOH, —$C_6H_5OH$, —R—$C_6H_5OH$, or a combination thereof, wherein R represents a linear alkyl group, a branched alkyl group, a cycloalkyl group, an organoamino group, an acid group-substituted organoamino group, or an aryl group and the number of carbon atoms in these groups is preferably 1 to 20, more preferably 1 to 10. The inorganic fillers may be in the form of, but are not limited to, particles, fine beads, thin plates, rods, or fibers. The size of the inorganic filler is in a range of about 2 nm to about 200 µm, or in a range of about 10 nm to about 100 µm, or in a range of about 50 nm to about 80 µm. In some embodiments, the inorganic filler is aminopropyl-N,N-bis(methyl phosphonic acid)-functionalized silica gel such as SilicaMetS® AMPA, aminopropyl-N,N-bis(methyl phosphonic acid)-functionalized fumed silica, n-propyl phosphonic acid-functionalized silica gel, n-propyl phosphonic acid-functionalized fumed silica, p-toluenesulfonic acid-functionalized silica gel, p-toluenesulfonic acid-functionalized fumed silica, 4-ethylbenzenesulfonic acid-functionalized silica gel such as SilicaBond® Tosic Acid, 4-ethylbenzenesulfonic acid-functionalized fumed silica, n-propyl sulfonic acid-functionalized silica gel, n-propyl sulfonic acid-functionalized fumed silica, or combinations thereof.

Suitable cation exchange polymers include, but are not limited to, a perfluorinated sulfonic acid-based polymer, a perfluorinated carboxylic acid polymer, a sulfonated aromatic hydrocarbon polymer, a cross-linked sulfonated aromatic hydrocarbon polymer, or combinations thereof. Suitable cation exchange polymers include, but are not limited to, a copolymer of tetrafluoroethylene and perfluoro-3,6-dioxa-4-methyl-7-octene-sulfonic acid, a copolymer of tetrafluoroethylene and perfluoro-5-oxa-6-heptene-sulfonic acid, a copolymer of tetrafluoroethylene and perfluoro-4-oxa-5-hexene-sulfonic acid, a copolymer of tetrafluoroethylene and perfluoro-3-oxa-4-pentene-sulfonic acid, a copolymer of perfluoro-3,6-dioxa-4-methyl-7-octene-sulfonic acid and perfluoro(2,2-dimethyl-1,3-dioxole), a copolymer of perfluoro-5-oxa-6-heptene-sulfonic acid and perfluoro(2,2-dimethyl-1,3-dioxole), a copolymer of perfluoro-4-oxa-5-hexene-sulfonic acid and perfluoro(2,2-dimethyl-1,3-dioxole), a copolymer of perfluoro-3-oxa-4-pentene-sulfonic acid and perfluoro(2,2-dimethyl-1,3-dioxole), a copolymer of perfluoro-3,6-dioxa-4-methyl-7-octene-sulfonic acid and perfluoro(2-methylene-4-methyl-1,3-dioxolane), a copolymer of perfluoro-5-oxa-6-heptene-sulfonic acid and perfluoro(2-methylene-4-methyl-1,3-dioxolane), a copolymer of perfluoro-4-oxa-5-hexene-sulfonic acid and perfluoro(2-methylene-4-methyl-1,3-dioxolane), a copolymer of perfluoro-3-oxa-4-pentene-sulfonic acid and perfluoro(2-methylene-4-methyl-1,3-dioxolane), a copolymer of perfluoro-3,6-dioxa-4-methyl-7-octene-sulfonic acid and 2,2,4-trifluoro-5-trifluoromethoxy-1,3-dioxole, a copolymer of perfluoro-5-oxa-6-heptene-sulfonic acid and 2,2,4-trifluoro-5-trifluoromethoxy-1,3-dioxole, a copolymer of perfluoro-4-oxa-5-hexene-sulfonic acid and 2,2,4-trifluoro-5-trifluoromethoxy-1,3-dioxole, a copolymer of perfluoro-3-oxa-4-pentene-sulfonic acid and 2,2,4-trifluoro-5-trifluoromethoxy-1,3-dioxole, sulfonated poly(ether ether ketone) (SPEEK), sulfonated polyether sulfone, sulfonated polyphenyl sulfone, sulfonated poly(2,6-dimethyl-1,4-phenylene oxide), sulfonated poly(4-phenoxybenzoyl-1,4-phenylene), sulfonated polyphenylene oxide, sulfonated poly(phenylene), sulfonated poly(phthalazinone), cross-linked SPEEK, cross-linked sulfonated polyether sulfone, cross-linked sulfonated polyphenyl sulfone, crosslinked poly(phenylene sulfide sulfone nitrile), sulfonated polystyrene, sulfonated poly(vinyl toluene), cross-linked sulfonated polystyrene, cross-linked sulfonated poly(vinyl toluene), or combinations thereof.

The catalyst coated membrane comprises a first polyelectrolyte multilayer coating 310 including alternating layers of a polycation polymer 315 and a polyanion polymer 320. There may be a second polyelectrolyte multilayer coating (not shown) comprising alternating layers of a polycation polymer and a polyanion polymer on the opposite side of the proton exchange membrane 305.

The first layer of the polyelectrolyte layers deposited on the proton exchange membrane should be a polycation polymer layer 315 having positive ionic charges. A polyanion polymer layer 320 with opposite charges is then deposited on the surface of the first polycation polymer coating layer 315 via electrostatic interactions to form the second part of the first polyelectrolyte bilayer. Polyelectrolyte multilayer coatings can be formed following the same alternating deposition process. This leads to the formation of a stable polyelectrolyte multilayer coating 310 via electrostatic interactions between the proton exchange membrane 305 and the first polyelectrolyte multilayer coating 310.

Polyelectrolyte multilayer coatings can be formed following the same alternating deposition process.

The thickness of each layer of the polyanion or polycation may be less than 50 nm, or less than 20 nm, or less than 10 nm, or less than 5 nm.

The first polyelectrolyte multilayer coating 310 may be thinner than the proton exchange membrane 305. Additionally, the first polyelectrolyte multilayer coating 310 and the second polyelectrolyte multilayer coating (not shown) may be thinner than the proton exchange membrane 305.

There is an anode coating layer 325 comprising anode particles 330 on the first polyelectrolyte multilayer coating 310, and a cathode coating layer 335 comprising cathode particles 340 on the opposite side of the proton exchange membrane 305. If the second polyelectrolyte multilayer coating is present, it will be positioned between the proton exchange membrane 305 and the cathode coating layer 335. The anode and cathode coating layers 325, 335 may be thinner than the proton exchange membrane 305 and thicker than the first polyelectrolyte multilayer coating 310.

There can optionally be a continuous nonprorous hydrogen recombination catalyst coating layer 345 between the proton exchange membrane 305 and the first polyelectrolyte multilayer coating 310. The hydrogen recombination catalyst coating layer 345 may include a catalyst and an ionomer. The catalyst is for a hydrogen recombination reaction and may be Pt, Pt/Co, Pd, Pd/Co, and mixtures thereof. The ionomer may be a proton-conductive fluorinated or non-fluorinated polymeric ionomer.

The hydrogen recombination catalyst coating layer 345 may further include an additive such as $CeO_2$, $Ce(OH)_4$, $CeO_2/ZrO_2$, $Ce(OH)_4/ZrO_2$, or mixtures thereof. These additives, such as $CeO_2$, $Ce(OH)_4$, $CeO_2/ZrO_2$, $Ce(OH)_4/ZrO_2$, or mixtures thereof, are radial scavengers with active redox couple of Ce(IV)/Ce(III). The catalytic $H_2$ recombination reaction in the $H_2$ recombination catalyst layer 345 and the catalytic reactions in the cathode 110 in the presence of $O_2$ also generate hydrogen peroxide and radical intermediates, such as hydroperoxyl (HOO·) and hydroxyl (HO·) radicals. These reactive oxygen species result in membrane and ionomer degradation. The incorporation of the radical scavenger into the $H_2$ recombination catalyst layer provides improved durability of the multilayer ion-exchange membrane.

FIGS. 3A-3C illustrate one embodiment of the method of recovering catalyst from a catalyst coated membrane. The system 400 includes tank 405, tank 410, and the cell 415 containing a catalyst coated membrane 300 with the anode catalyst coating layer 325 side connected to tank 410. As shown in FIGS. 3A-3B, when the catalyst coated membrane at the end of life in a PEM electrolyzer is assembled in the cell 415, an alkaline solution 420 such as KOH aqueous solution is placed in tank 410 and contacts the anode side of the catalyst coated membrane 300. The alkaline solution 420 dissolves the first polyelectrolyte multilayer coating 310, releasing the anode coating particles 330, which can then be collected. The proton exchange membrane 305 and the cathode catalyst coating layer 335 remain.

As shown in FIG. 3C, when the alkaline solution is added to tank 410 and tank 405, the polyelectrolyte layers on both sides of the proton exchange membrane 305 is dissolved, releasing the anode and cathode catalyst particles 330, 340. The proton exchange membrane 305 remains. The anode and/or cathode particles 330, 340 can be collected.

The proton exchange membrane may comprise a reinforced proton exchange membrane or a non-reinforced proton exchange membrane. The proton exchange membrane may be reinforced using polytetrafluoroethylene (PTFE), polyphenylene sulfide (PPS), polyvinylidene difluoride (PVDF), polychlorotrifluoroethylene (PCTFE), polyether ether ketone (PEEK), polyimide (PI), polyetherimide (PEI), polybenzoxazole (PBO), polybenzimidazole (PBI), polysulfone (PSF), polyethersulfone (PES), polyaramid, polypropylene (PP), polyethylene (PE), co-PP-PE, or combinations thereof. Suitable reinforced proton exchange membranes are described in U.S. Provisional Application Ser. No. 63/509,806, which is incorporated herein by reference in its entirety.

The catalyst coated membrane may further comprise a continuous nonporous hydrogen recombination catalyst coating layer between the proton exchange membrane layer and the first continuous nonporous cross-linked polyelectrolyte multilayer coating. The continuous nonporous hydrogen recombination catalyst coating layer may comprise a mixture of a hydrogen recombination catalyst and a proton conducting ionomer.

The hydrogen recombination catalyst may comprise any suitable hydrogen recombination catalyst. Suitable hydrogen recombination catalysts include, but are not limited to, Pt, Pt supported on carbon or silica, PtCo, PtCo supported on carbon or silica, Pd, Pd supported on carbon or silica, PdCo, PdCo supported on carbon or silica, or mixtures thereof.

The proton conducting ionomer may comprise any suitable proton conducting ionomer. Suitable proton conducting ionomers include, but are not limited to, a perfluorosulfonic acid (PFSA) polymer selected from copolymer of tetrafluoroethylene and perfluoro-3,6-dioxa-4-methyl-7-octene-sulfonic acid, a copolymer of tetrafluoroethylene and perfluoro-5-oxa-6-heptene-sulfonic acid, a copolymer of tetrafluoroethylene and perfluoro-4-oxa-5-hexene-sulfonic acid, a copolymer of tetrafluoroethylene and perfluoro-3-oxa-4-pentene-sulfonic acid, a copolymer of perfluoro-3,6-dioxa-4-methyl-7-octene-sulfonic acid and perfluoro(2,2-dimethyl-1,3-dioxole), a copolymer of perfluoro-5-oxa-6-heptene-sulfonic acid and perfluoro(2,2-dimethyl-1,3-dioxole), a copolymer of perfluoro-4-oxa-5-hexene-sulfonic acid and perfluoro(2,2-dimethyl-1,3-dioxole), a copolymer of perfluoro-3-oxa-4-pentene-sulfonic acid and perfluoro(2,2-dimethyl-1,3-dioxole), a copolymer of perfluoro-3,6-dioxa-4-methyl-7-octene-sulfonic acid and perfluoro(2-methylene-4-methyl-1,3-dioxolane), a copolymer of perfluoro-5-oxa-6-heptene-sulfonic acid and perfluoro(2-methylene-4-methyl-1,3-dioxolane), a copolymer of perfluoro-4-oxa-5-hexene-sulfonic acid and perfluoro(2-methylene-4-methyl-1,3-dioxolane), a copolymer of perfluoro-3-oxa-4-pentene-sulfonic acid and perfluoro(2-methylene-4-methyl-1,3-dioxolane), a copolymer of perfluoro-3,6-dioxa-4-methyl-7-octene-sulfonic acid and 2,2,4-trifluoro-5-trifluoromethoxy-1,3-dioxole, a copolymer of perfluoro-5-oxa-6-heptene-sulfonic acid and 2,2,4-trifluoro-5-trifluoromethoxy-1,3-dioxole, a copolymer of perfluoro-4-oxa-5-hexene-sulfonic acid and 2,2,4-trifluoro-5-trifluoromethoxy-1,3-dioxole, or a copolymer of perfluoro-3-oxa-4-pentene-sulfonic acid and 2,2,4-trifluoro-5-trifluoromethoxy-1,3-dioxole, a non-PFSA polymer selected from sulfonated poly(ether ether ketone) (SPEEK), sulfonated polyether sulfone, sulfonated polyphenyl sulfone, sulfonated poly(2,6-dimethyl-1,4-phenylene oxide), sulfonated poly(4-phenoxybenzoyl-1,4-phenylene), sulfonated polyphenylene oxide, sulfonated poly(phenylene), sulfonated poly(phthalazinone), cross-linked SPEEK, cross-linked sulfonated polyether sulfone, cross-linked sulfonated polyphenyl sulfone, crosslinked poly(phenylene sulfide sulfone nitrile), sulfonated polystyrene, sulfonated poly(vinyl toluene), cross-linked sulfonated polystyrene, or cross-linked sulfonated poly(vinyl toluene), or combinations thereof.

The continuous nonporous hydrogen recombination catalyst coating layer may further comprise a radical scavenger. Any suitable radical scavenger can be used. Suitable radical scavenger include, but are not limited to, $CeO_2$, $Ce(OH)_4$, $CeO_2/ZrO_2$, $Ce(OH)_4/ZrO_2$, or mixtures thereof.

The polyanion polymer in the first and/or second continuous nonporous cross-linked polyelectrolyte multilayer coating may comprise, but is not limited to, sulfonated poly (ether ether ketone), sulfonated polyether sulfone, sulfonated polyphenyl sulfone, sulfonated poly(2,6-dimethyl-1,4-phenylene oxide), sulfonated poly(4-phenoxybenzoyl-1,4-phenylene), sulfonated polyphenylene oxide, sulfonated poly(phenylene), sulfonated poly(phthalazinone), sulfonated polystyrene, sulfonated poly(vinyl toluene), poly(acrylic acid), poly(vinylsulfonic acid sodium), poly(sodium phosphate), a negatively charged polysaccharide polyanion polymer selected from the group consisting of sodium alginate, potassium alginate, calcium alginate, ammonium alginate, alginic acid, sodium hyaluronate, potassium hyaluronate, calcium hyaluronate, ammonium hyaluronate, hyaluronic acid, κ-carrageenan, ι-carrageenan, ι-carrageenan, carboxymethyl curdlan, sodium carboxymethyl curdlan, potassium carboxymethyl curdlan, calcium carboxymethyl curdlan, ammonium carboxymethyl curdlan, carboxymethyl cellulose, sodium carboxymethyl cellulose, potassium carboxymethyl cellulose, calcium carboxymethyl cellulose, ammonium carboxymethyl cellulose, pectic acid, or combinations thereof.

The polycation polymer in the first and/or second continuous nonporous cross-linked polyelectrolyte multilayer coating may comprise, but is not limited to, a protonated chitosan, an amine based linear, hyperbranched, or dendritic polycation polymer selected from the group consisting of polybiguanide, quaternary ammonium polyethylenimine, quaternary ammonium polypropylenimine, quaternary ammonium polyamidoamine (PAMAM), poly(vinylamine hydrochloride) (PVH), poly(allylamine hydrochloride) (PAH), poly(amidoamine hydrochloride), poly(N-isopropylallylamine hydrochloride), poly(N-tert-butylallylamine hydrochloride), poly(N-1,2-dimethylpropylallylamine hydrochloride), poly(N-methylallylamine hydrochloride), poly(N,N-dimethylallylamine hydrochloride), poly(2-vinylpiperidine hydrochloride), poly(4-vinylpiperidine hydrochloride), poly(diallyldimethylammonium chloride), poly(acrylamide-co-diallyldimethylammonium chloride), poly(diallyl methyl amine hydrochloride), a copolymer of 2-propen-1-amine-hydrochloride with N-2-propenyl-2-propen-1-aminehydrochloride, poly(N-alkyl-4-vinylpyridinium) salt, polylysine, polyornithine, polyarginine, poly(ethylene oxide)-block-poly(vinyl benzyl trimethylammonium chloride), poly(ethylene oxide)-block-poly(1-lysine), poly(2-methacryloyloxyethyl phosphorylcholine methacrylate)-block-poly(vinyl benzyl trimethylammonium chloride), poly[2-(dimethylamino)-ethyl methacrylate, poly[3-(dimethylamino)-propyl methacrylate], poly[2-(dimethylamino)-ethyl methacrylamide], poly[3-(dimethylamino) propyl methacrylamide], poly[2-(trimethylamino)ethyl methacrylate chloride], poly[2-(diethylamino)ethyl methacrylate], poly[2-(dimethylamino) ethyl acrylate], poly(4-vinylpyridine), or combinations thereof.

EXAMPLES

The following examples are provided to illustrate one or more embodiments of the invention but are not limited embodiments thereof. Numerous variations can be made to the following examples that lie within the scope of the invention.

Example 1: Catalyst Recycle From a 2-Layer Catalyst Coated Membrane by Heating and Stirring One 30 cm$^2$ 2-layer anode catalyst coated membrane comprising a multilayer cation-exchange membrane comprising a polyelectrolyte multilayer, a $H_2$ recombination catalyst layer, and $CeO_2$ in the $H_2$ recombination catalyst layer (PEL-$H_2$RCe-PEM) as described in Example 3 in U.S. Provisional Patent Application No. 63/476,983, filed on Dec. 23, 2022, and an anode comprising $IrO_2$ catalyst coated on the surface of poly(allylamine hydrochloride) (PAH) and sulfonated poly(ether ether ketone) (SPEEK) polyelectrolyte bilayers of the PEL-$H_2$RCe-PEM membrane as described in Example 4 in U.S. Provisional Patent Application No. 63/476,983, filed on Dec. 23, 2022, was added to a bottle comprising 250 mL of 1 M KOH aqueous solution. The bottle was heated at 80° C. under stirring for about 24 h. The PEL-$H_2$RCe-PEM membrane without the anode $IrO_2$ catalyst coating was removed from the KOH solution, rinsed with ultrapure water, and recycled. The $IrO_2$ catalyst particles were collected from the KOH aqueous solution by filtration, rinsed with ultrapure water, and recycled.

Example 2: Catalyst Recycle From a 2-Layer Catalyst Coated Membrane by Heating and Sonication One 30 cm$^2$ 2-layer anode catalyst coated membrane comprising a PEL-$H_2$RCe-PEM membrane as described in Example 3 in U.S. Provisional Patent Application No. 63/476,983, filed on Dec. 23, 2022, and an anode comprising $IrO_2$ catalyst coated on the surface of the PAH/SPEEK polyelectrolyte bilayers of the PEL-$H_2$RCe-PEM membrane as described in Example 4 in U.S. Provisional Patent Application No. 63/476,983, filed on Dec. 23, 2022, was added to a bottle comprising 250 mL of 1 M KOH aqueous solution. The bottle was heated at 50° C. in an ultrasonication bath for about 2-3 h. The PEL-$H_2$RCe-PEM membrane without the anode $IrO_2$ catalyst coating was removed from the KOH solution, rinsed with ultrapure water, and recycled. The $IrO_2$ catalyst particles were collected from the KOH aqueous solution by filtration, rinsed with ultrapure water, and recycled.

Example 3: Catalyst Recycle From a 3-Layer Catalyst Coated Membrane by a Continuous Recycling Process One 3-layer catalyst coated membrane comprising a (SPEEK-PAH)$_n$/Nafion®-212/(PAH-SPEEK)$_n$ membrane as described in Example 1 in U.S. patent application Ser. No. 17/451,227, filed on Oct. 18, 2021, an anode comprising $IrO_2$ catalyst coated on one surface of the (SPEEK-PAH)$_n$/Nafion®-212/(PAH-SPEEK)$_n$ membrane, and a cathode comprising Pt/C catalyst coated on the other surface of the (SPEEK-PAH)$_n$/Nafion®-212/(PAH-SPEEK)$_n$ membrane as described in Example 5 in U.S. patent application Ser. No. 17/451,227, filed on Oct. 18, 2021, was assembled to a 50-80° C. heated catalyst recycling circulating system comprising two separate chambers connected to two circulating pumps and two containers comprising 1 M KOH aqueous solution for anode $IrO_2$ catalyst and cathode Pt/C catalyst recycling, respectively, as shown in FIG. 3. The KOH aqueous solutions heated at 50-80° C. were continuously circulated in the anode side and the cathode side separately for about 12-20 h. The recycled $IrO_2$ and Pt/C catalysts in the KOH containers were filtered and dried to recover the catalysts.

Example 4: Catalyst Recycle From a Used PEM Eletrolyzer Stack Comprising 3-Layer Catalyst Coated Membranes by a Continuous Recycling Process A used PEM eletrolyzer stack comprising numerous 3-layer catalyst coated membranes comprising a (SPEEK-PAH)$_n$/Nafion®-212/(PAH-SPEEK)$_n$ membrane as described in Example 1 in U.S. patent application Ser. No. 17/451,227, filed on Oct. 18, 2021, an anode comprising $IrO_2$ catalyst coated on one surface of the (SPEEK-PAH)$_n$/Nafion®-212/(PAH-SPEEK)$_n$ membrane, and a cathode comprising Pt/C catalyst coated on the other surface of the (SPEEK-PAH)$_n$/Nafion®-212/(PAH-SPEEK)$_n$ membrane as described in Example 5 in U.S. patent application Ser. No. 17/451,227, filed on Oct. 18, 2021, was connected to two circulating pumps and two containers comprising 1 M KOH aqueous solution for anode $IrO_2$ catalyst and cathode Pt/C catalyst recycling, respectively. The KOH aqueous solutions heated at 50-80° C. were continuously circulated in the anode side and the cathode side of the used PEM eletrolyzer stack separately for about 12-20 h. The recycled $IrO_2$ and Pt/C catalysts in the KOH containers were filtered and dried to recover the catalysts.

Specific Embodiments

While the following is described in conjunction with specific embodiments, it will be understood that this description is intended to illustrate and not limit the scope of the preceding description and the appended claims.

A first embodiment of the invention is a method for recovering catalyst from a catalyst coated membrane comprising providing a catalyst coated membrane comprising a proton exchange membrane, the proton exchange membrane having a first surface and a second surface; a first continuous nonporous cross-linked polyelectrolyte multilayer coating on the first surface of the proton exchange membrane, the first continuous polyelectrolyte multilayer coating comprising alternating layers of a polycation polymer and a polyanion polymer; an anode coating layer comprising anode catalyst particles on the continuous nonporous cross-linked polyelectrolyte multilayer coating on the first surface of the proton exchange membrane; a cathode coating layer comprising cathode catalyst particles on the second surface of the proton exchange membrane; and optionally a second continuous nonporous cross-linked polyelectrolyte multilayer coating between the second surface of the proton exchange membrane and the cathode coating layer; contacting the catalyst coated membrane with an alkaline solution and dissolving the first continuous nonporous cross-linked polyelectrolyte multilayer coating or the first and the second continuous nonporous cross-linked polyelectrolyte multilayer coatings; and recovering the anode catalyst particles or recovering both the anode catalyst particles and the cathode catalyst particles separately. An embodiment of the invention is one, any or all of prior embodiments in this paragraph up through the first embodiment in this paragraph wherein contacting the catalyst coated membrane in the presence of the alkaline solution further comprises heating the catalyst coated membrane and/or the alkaline solution, sonicating the catalyst coated membrane and/or the alkaline solution, or heating and sonicating the catalyst coated membrane and/or the alkaline solution. An embodiment of the invention is one, any or all of prior embodiments in this paragraph up through the first embodiment in this paragraph wherein the catalyst coated membrane is heated at a temperature in a range of 30° C. to 150° C. An embodiment of the invention is one, any or all of prior embodiments in this paragraph up through the first embodiment in this paragraph wherein the alkaline solution is added to an anode side of the catalyst coated membrane, or a cathode side of the catalyst coated membrane, or both the anode side and the cathode side of the catalyst coated membrane. An embodiment of the invention is one, any or all of prior embodiments in this paragraph up through the first embodiment in this paragraph wherein the anode catalyst particles comprise a platinum group metal (PGM), a PGM supported on a different PGM support, a PGM supported on a non-PGM support, an alloy thereof, an oxide thereof, a carbide thereof, a phosphide thereof, or combinations thereof. An embodiment of the invention is one, any or all of prior embodiments in this paragraph up through the first embodiment in this paragraph wherein the anode catalyst particles comprise iridium, iridium supported on a different PGM support, iridium supported on a non-PGM support, platinum, platinum supported on a non-PGM support, ruthenium, ruthenium supported on a non-PGM support, osmium, rhodium, palladium, tin, tungsten, vanadium, cobalt, silver, gold, copper, nickel, molybdenum, iron, chromium, alloys thereof, oxides thereof, carbides thereof, phosphides thereof, or combinations thereof. An embodiment of the invention is one, any or all of prior embodiments in this paragraph up through the first embodiment in this paragraph wherein the anode catalyst particles comprise iridium, iridium supported on a different PGM support, iridium supported on a non-PGM support, platinum, platinum supported on a non-PGM support, ruthenium, ruthenium supported on a non-PGM support, oxides thereof, or combinations thereof. An embodiment of the invention is one, any or all of prior embodiments in this paragraph up through the first embodiment in this paragraph wherein the cathode catalyst particles comprise a platinum group metal (PGM), a PGM supported on a non-PGM support, an alloy thereof, or combinations thereof. An embodiment of the invention is one, any or all of prior embodiments in this paragraph up through the first embodiment in this paragraph wherein the cathode catalyst particles comprise platinum, platinum supported on a non-PGM support, ruthenium, ruthenium supported on a non-PGM support, osmium, rhodium, palladium, tin, tungsten, vanadium, cobalt, silver, gold, nickel, molybdenum, iron, copper, chromium, alloys thereof, carbides thereof, phosphides thereof, or combinations thereof. An embodiment of the invention is one, any or all of prior embodiments in this paragraph up through the first embodiment in this paragraph wherein the cathode catalyst particles comprise platinum, platinum supported on carbon support, platinum supported on graphene support, platinum supported on graphene oxide support, ruthenium, ruthenium supported on carbon support, ruthenium supported on graphene support, ruthenium supported on graphene oxide support, platinum and ruthenium supported on carbon support, or combinations thereof. An embodiment of the invention is one, any or all of prior embodiments in this paragraph up through the first embodiment in this paragraph wherein the polycation polymer layer of the first continuous nonporous cross-linked polyelectrolyte multilayer coating is in contact with the first surface of the proton exchange membrane or wherein the polycation polymer layer of the first continuous nonporous cross-linked polyelectrolyte multilayer coating is in contact with the first surface of the proton exchange membrane and wherein the polycation polymer layer of the second continuous nonporous cross-linked polyelectrolyte multilayer coating is in contact with the second surface of the proton exchange membrane. An embodiment of the invention is one, any or all of prior embodiments in this paragraph up through the first embodiment in this paragraph wherein the alkaline solution comprises KOH, NaOH, LiOH, CsOH, KHCO$_3$, K$_2$CO$_3$, LiHCO$_3$, Li$_2$CO$_3$, NaHCO$_3$, Na$_2$CO$_3$, or combinations thereof. An embodiment of the invention is one, any or all of prior embodiments in this paragraph up through the first embodiment in this paragraph wherein the proton exchange membrane comprises a reinforced proton exchange membrane or a non-reinforced proton exchange membrane. An embodiment of the invention is one, any or all of prior embodiments in this paragraph up through the first embodiment in this paragraph wherein the catalyst coated membrane further comprises a continuous nonporous hydrogen recombination catalyst coating layer between the proton exchange membrane layer and the first continuous nonporous cross-linked polyelectrolyte multilayer coating; wherein the continuous nonporous hydrogen recombination catalyst coating layer comprises a mixture of a hydrogen recombination catalyst and a proton conducting ionomer. An embodiment of the invention is one, any or all of prior embodiments in this paragraph up through the first embodiment in this paragraph wherein the hydrogen recombination catalyst comprises Pt, Pt supported on carbon or silica, PtCo, PtCo supported on carbon or silica, Pd, Pd supported on carbon or silica, PdO, PdCo supported on carbon or silica, or mixtures thereof. An embodiment of the invention is one, any or all of prior embodiments in this paragraph up through the first embodiment in this paragraph wherein the proton conducting ionomer comprises a perfluorosulfonic acid (PFSA) polymer selected from copolymer of tetrafluoroethylene and perfluoro-3,6-dioxa-4-methyl-7-octene-sulfonic acid, a copolymer of tetrafluoroethylene and perfluoro-5-oxa-6-heptene-sulfonic acid, a copolymer of tetrafluoroethylene and perfluoro-4-oxa-5-hexene-sulfonic acid, a copolymer of tetrafluoroethylene and perfluoro-3-oxa-4-pentene-sulfonic acid, a copolymer of perfluoro-3,6-dioxa-4-methyl-7-octene-sulfonic acid and perfluoro(2,2-dimethyl-1,3-dioxole), a copolymer of perfluoro-5-oxa-6-heptene-sulfonic acid and perfluoro(2,2-dimethyl-1,3-dioxole), a copolymer of perfluoro-4-oxa-5-hexene-sulfonic acid and perfluoro(2,2-dimethyl-1,3-dioxole), a copolymer of perfluoro-3-oxa-4-pentene-sulfonic acid and perfluoro(2,2-dimethyl-1,3-dioxole), a copolymer of perfluoro-3,6-dioxa-4-methyl-7-octene-sulfonic acid and perfluoro(2-methylene-4-methyl-1,3-dioxolane), a copolymer of perfluoro-5-oxa-6-heptene-sulfonic acid and perfluoro(2-methylene-4-methyl-1,3-dioxolane), a copolymer of perfluoro-4-oxa-5-hexene-sulfonic acid and perfluoro(2-methylene-4-methyl-1,3-dioxolane), a copolymer of perfluoro-3-oxa-4-pentene-sulfonic acid and perfluoro(2-methylene-4-methyl-1,3-dioxolane), a copolymer of perfluoro-3,6-dioxa-4-methyl-7-octene-sulfonic acid and 2,2,4-trifluoro-5-trifluoromethoxy-1,3-dioxole, a copolymer of perfluoro-5-oxa-6-heptene-sulfonic acid and 2,2,4-trifluoro-5-trifluoromethoxy-1,3-dioxole, a copolymer of perfluoro-4-oxa-5-hexene-sulfonic acid and 2,2,4-trifluoro-5-trifluoromethoxy-1,3-dioxole, or a copolymer of perfluoro-3-oxa-4-pentene-sulfonic acid and 2,2,4-trifluoro-5-trifluoromethoxy-1,3-dioxole, a non-PFSA polymer selected from sulfonated poly(ether ether ketone) (SPEEK), sulfonated polyether sulfone, sulfonated polyphenyl sulfone, sulfonated poly(2,6-dimethyl-1,4-phenylene oxide), sulfonated poly(4-phenoxybenzoyl-1,4-phenylene), sulfonated polyphenylene oxide, sulfonated poly(phenylene), sulfonated poly(phthalazinone), cross-linked SPEEK, cross-linked sulfonated polyether sulfone, cross-linked sulfonated polyphenyl sulfone, crosslinked poly(phenylene sulfide sulfone nitrile), sulfonated polystyrene, sulfonated poly(vinyl toluene), cross-linked sulfonated polystyrene, or cross-linked sulfonated poly(vinyl toluene), or combinations thereof. An embodiment of the invention is one, any or all of prior embodiments in this paragraph up through the first embodiment in this paragraph wherein the continuous nonporous hydrogen recombination catalyst coating layer further comprises a radical scavenger. An embodiment of the invention is one, any or all of prior embodiments in this paragraph up through the first embodiment in this paragraph wherein the radical scavenger comprises CeO$_2$, Ce(OH)$_4$, CeO$_2$/ZrO$_2$, Ce(OH)$_4$/ZrO$_2$, or mixtures thereof. An embodiment of the invention is one, any or all of prior embodiments in this paragraph up through the first embodiment in this paragraph wherein the polyanion polymer comprises sulfonated poly(ether ether ketone), sulfonated polyether sulfone, sulfonated polyphenyl sulfone, sulfonated poly(2,6-dimethyl-1,4-phenylene oxide), sulfonated poly(4-phenoxybenzoyl-1,4-phenylene), sulfonated polyphenylene oxide, sulfonated poly(phenylene), sulfonated poly(phthalazinone), sulfonated polystyrene, sulfonated poly(vinyl toluene), poly(acrylic acid), poly(vinylsulfonic acid sodium), poly(sodium phosphate), a negatively charged polysaccharide polyanion polymer selected from the group consisting of sodium alginate, potassium alginate, calcium alginate, ammonium alginate, alginic acid, sodium hyaluronate, potassium hyaluronate, calcium hyaluronate, ammonium hyaluronate, hyaluronic acid, κ-carrageenan, λ-carrageenan, ι-carrageenan, carboxymethyl curdlan, sodium carboxymethyl curdlan, potassium carboxymethyl curdlan, calcium carboxymethyl curdlan, ammonium carboxymethyl curdlan, carboxymethyl cellulose, sodium carboxymethyl cellulose, potassium carboxymethyl cellulose, calcium carboxymethyl cellulose, ammonium carboxymethyl cellulose, pectic acid, or combinations thereof. An embodiment of the invention is one, any or all of prior embodiments in this paragraph up through the first embodiment in this paragraph wherein the polycation polymer comprises a protonated chitosan, an amine based linear, hyperbranched, or dendritic polycation polymer selected from the group consisting of polybiguanide, quaternary ammonium polyethylenimine, quaternary ammonium polypropylenimine, quaternary ammonium polyamidoamine (PAMAM), poly(vinylamine hydrochloride) (PVH), poly(allylamine hydrochloride) (PAH), poly(amidoamine hydrochloride), poly(N-isopropylallylamine hydrochloride), poly(N-tert-butylallylamine hydrochloride), poly(N-1,2-dimethylpropylallylamine hydrochloride), poly(N-methylallylamine hydrochloride), poly(N,N-dimethylallylamine hydrochloride), poly(2-vinylpiperidine hydrochloride), poly(4-vinylpiperidine hydrochloride), poly(diallyldimethylammonium chloride), poly(acrylamide-co-diallyldimethylammonium chloride), poly(diallyl methyl amine hydrochloride), a copolymer of 2-propen-1-amine-hydrochloride with N-2-propenyl-2-propen-1-aminehydrochloride, poly(N-alkyl-4-vinylpyridinium) salt, polylysine, polyornithine, polyarginine, poly(ethylene oxide)-block-poly(vinyl benzyl trimethylammonium chloride), poly(ethylene oxide)-block-poly(1-lysine), poly(2-methacryloyloxyethyl phosphorylcholine methacrylate)-block-poly(vinyl benzyl trimethylammonium chloride), poly[2-(dimethylamino)-ethyl methacrylate, poly[3-(dimethylamino)-propyl methacrylate], poly[2-(dimethylamino)-ethyl methacrylamide], poly[3-(dimethylamino) propyl methacrylamide], poly [2-(trimethylamino)ethyl methacrylate chloride], poly[2-(diethylamino)ethyl methacrylate], poly[2-(dimethylamino) ethyl acrylate], poly(4-vinylpyridine), or combinations thereof.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. A method for recovering catalyst from a catalyst coated membrane comprising:
   providing a catalyst coated membrane comprising:
      a proton exchange membrane, the proton exchange membrane having a first surface and a second surface;
      a first continuous nonporous cross-linked polyelectrolyte multilayer coating on the first surface of the proton exchange membrane, the first continuous polyelectrolyte multilayer coating comprising alternating layers of a polycation polymer and a polyanion polymer;
      an anode coating layer comprising anode catalyst particles on the continuous nonporous cross-linked polyelectrolyte multilayer coating on the first surface of the proton exchange membrane;
      a cathode coating layer comprising cathode catalyst particles on the second surface of the proton exchange membrane; and
      optionally a second continuous nonporous cross-linked polyelectrolyte multilayer coating between the second surface of the proton exchange membrane and the cathode coating layer;
   contacting the catalyst coated membrane with an alkaline solution and dissolving the first continuous nonporous cross-linked polyelectrolyte multilayer coating or the first and the second continuous nonporous cross-linked polyelectrolyte multilayer coatings; and
   recovering the anode catalyst particles or recovering both the anode catalyst particles and the cathode catalyst particles separately.

2. The method of claim 1 wherein contacting the catalyst coated membrane in the presence of the alkaline solution further comprises heating the catalyst coated membrane and/or the alkaline solution, sonicating the catalyst coated membrane and/or the alkaline solution, or heating and sonicating the catalyst coated membrane and/or the alkaline solution.

3. The method of claim 2 wherein the catalyst coated membrane is heated at a temperature in a range of 30° C. to 150° C.

4. The method of claim 1 wherein the alkaline solution is added to an anode side of the catalyst coated membrane, or a cathode side of the catalyst coated membrane, or both the anode side and the cathode side of the catalyst coated membrane.

5. The method of claim 1 wherein the anode catalyst particles comprise a platinum group metal (PGM), a PGM supported on a different PGM support, a PGM supported on a non-PGM support, an alloy thereof, an oxide thereof, a carbide thereof, a phosphide thereof, or combinations thereof.

6. The method of claim 1 wherein the anode catalyst particles comprise iridium, iridium supported on a different PGM support, iridium supported on a non-PGM support, platinum, platinum supported on a non-PGM support, ruthenium, ruthenium supported on a non-PGM support, osmium, rhodium, palladium, tin, tungsten, vanadium, cobalt, silver, gold, copper, nickel, molybdenum, iron, chromium, alloys thereof, oxides thereof, carbides thereof, phosphides thereof, or combinations thereof.

7. The method of claim 1 wherein the anode catalyst particles comprise iridium, iridium supported on a different PGM support, iridium supported on a non-PGM support, platinum, platinum supported on a non-PGM support, ruthenium, ruthenium supported on a non-PGM support, oxides thereof, or combinations thereof.

8. The method of claim 1 wherein the cathode catalyst particles comprise a platinum group metal (PGM), a PGM supported on a non-PGM support, an alloy thereof, or combinations thereof.

9. The method of claim 1 wherein the cathode catalyst particles comprise platinum, platinum supported on a non-PGM support, ruthenium, ruthenium supported on a non-PGM support, osmium, rhodium, palladium, tin, tungsten, vanadium, cobalt, silver, gold, nickel, molybdenum, iron, copper, chromium, alloys thereof, carbides thereof, phosphides thereof, or combinations thereof.

10. The method of claim 1 wherein the cathode catalyst particles comprise platinum, platinum supported on carbon support, platinum supported on graphene support, platinum supported on graphene oxide support, ruthenium, ruthenium supported on carbon support, ruthenium supported on graphene support, ruthenium supported on graphene oxide support, platinum and ruthenium supported on carbon support, or combinations thereof.

11. The method of claim 1 wherein the polycation polymer layer of the first continuous nonporous cross-linked polyelectrolyte multilayer coating is in contact with the first surface of the proton exchange membrane or wherein the polycation polymer layer of the first continuous nonporous cross-linked polyelectrolyte multilayer coating is in contact with the first surface of the proton exchange membrane and wherein the polycation polymer layer of the second continuous nonporous cross-linked polyelectrolyte multilayer coating is in contact with the second surface of the proton exchange membrane.

12. The method of claim 1 wherein the alkaline solution comprises KOH, NaOH, LiOH, CsOH, $KHCO_3$, $K_2CO_3$, $LiHCO_3$, $Li_2CO_3$, $NaHCO_3$, $Na_2CO_3$, or combinations thereof.

13. The method of claim 1 wherein the proton exchange membrane comprises a reinforced proton exchange membrane or a non-reinforced proton exchange membrane.

14. The method of claim 1 wherein the catalyst coated membrane further comprises:
   a continuous nonporous hydrogen recombination catalyst coating layer between the proton exchange membrane layer and the first continuous nonporous cross-linked polyelectrolyte multilayer coating;

wherein the continuous nonporous hydrogen recombination catalyst coating layer comprises a mixture of a hydrogen recombination catalyst and a proton conducting ionomer.

15. The method of claim 14 wherein the hydrogen recombination catalyst comprises Pt, Pt supported on carbon or silica, PtCo, PtCo supported on carbon or silica, Pd, Pd supported on carbon or silica, PdCo, PdCo supported on carbon or silica, or mixtures thereof.

16. The method of claim 14 wherein the proton conducting ionomer comprises a perfluorosulfonic acid (PFSA) polymer selected from copolymer of tetrafluoroethylene and perfluoro-3,6-dioxa-4-methyl-7-octene-sulfonic acid, a copolymer of tetrafluoroethylene and perfluoro-5-oxa-6-heptene-sulfonic acid, a copolymer of tetrafluoroethylene and perfluoro-4-oxa-5-hexene-sulfonic acid, a copolymer of tetrafluoroethylene and perfluoro-3-oxa-4-pentene-sulfonic acid, a copolymer of perfluoro-3,6-dioxa-4-methyl-7-octene-sulfonic acid and perfluoro(2,2-dimethyl-1,3-dioxole), a copolymer of perfluoro-5-oxa-6-heptene-sulfonic acid and perfluoro(2,2-dimethyl-1,3-dioxole), a copolymer of perfluoro-4-oxa-5-hexene-sulfonic acid and perfluoro(2,2-dimethyl-1,3-dioxole), a copolymer of perfluoro-3-oxa-4-pentene-sulfonic acid and perfluoro(2,2-dimethyl-1,3-dioxole), a copolymer of perfluoro-3,6-dioxa-4-methyl-7-octene-sulfonic acid and perfluoro(2-methylene-4-methyl-1,3-dioxolane), a copolymer of perfluoro-5-oxa-6-heptene-sulfonic acid and perfluoro(2-methylene-4-methyl-1,3-dioxolane), a copolymer of perfluoro-4-oxa-5-hexene-sulfonic acid and perfluoro(2-methylene-4-methyl-1,3-dioxolane), a copolymer of perfluoro-3-oxa-4-pentene-sulfonic acid and perfluoro(2-methylene-4-methyl-1,3-dioxolane), a copolymer of perfluoro-3,6-dioxa-4-methyl-7-octene-sulfonic acid and 2,2,4-trifluoro-5-trifluoromethoxy-1,3-dioxole, a copolymer of perfluoro-5-oxa-6-heptene-sulfonic acid and 2,2,4-trifluoro-5-trifluoromethoxy-1,3-dioxole, a copolymer of perfluoro-4-oxa-5-hexene-sulfonic acid and 2,2,4-trifluoro-5-trifluoromethoxy-1,3-dioxole, or a copolymer of perfluoro-3-oxa-4-pentene-sulfonic acid and 2,2,4-trifluoro-5-trifluoromethoxy-1,3-dioxole, a non-PFSA polymer selected from sulfonated poly(ether ether ketone) (SPEEK), sulfonated polyether sulfone, sulfonated polyphenyl sulfone, sulfonated poly(2,6-dimethyl-1,4-phenylene oxide), sulfonated poly(4-phenoxybenzoyl-1,4-phenylene), sulfonated polyphenylene oxide, sulfonated poly(phenylene), sulfonated poly(phthalazinone), cross-linked SPEEK, cross-linked sulfonated polyether sulfone, cross-linked sulfonated polyphenyl sulfone, crosslinked poly(phenylene sulfide sulfone nitrile), sulfonated polystyrene, sulfonated poly(vinyl toluene), cross-linked sulfonated polystyrene, or cross-linked sulfonated poly(vinyl toluene), or combinations thereof.

17. The method of claim 14 wherein the continuous nonporous hydrogen recombination catalyst coating layer further comprises a radical scavenger.

18. The method of claim 17 wherein the radical scavenger comprises $CeO_2$, $Ce(OH)_4$, $CeO_2/ZrO_2$, $Ce(OH)_4/ZrO_2$, or mixtures thereof.

19. The method of claim 1 wherein the polyanion polymer comprises sulfonated poly(ether ether ketone), sulfonated polyether sulfone, sulfonated polyphenyl sulfone, sulfonated poly(2,6-dimethyl-1,4-phenylene oxide), sulfonated poly(4-phenoxybenzoyl-1,4-phenylene), sulfonated polyphenylene oxide, sulfonated poly(phenylene), sulfonated poly(phthalazinone), sulfonated polystyrene, sulfonated poly(vinyl toluene), poly(acrylic acid), poly(vinylsulfonic acid sodium), poly(sodium phosphate), a negatively charged polysaccharide polyanion polymer selected from the group consisting of sodium alginate, potassium alginate, calcium alginate, ammonium alginate, alginic acid, sodium hyaluronate, potassium hyaluronate, calcium hyaluronate, ammonium hyaluronate, hyaluronic acid, κ-carrageenan, λ-carrageenan, ι-carrageenan, carboxymethyl curdlan, sodium carboxymethyl curdlan, potassium carboxymethyl curdlan, calcium carboxymethyl curdlan, ammonium carboxymethyl curdlan, carboxymethyl cellulose, sodium carboxymethyl cellulose, potassium carboxymethyl cellulose, calcium carboxymethyl cellulose, ammonium carboxymethyl cellulose, pectic acid, or combinations thereof.

20. The method of claim 1 wherein the polycation polymer comprises a protonated chitosan, an amine based linear, hyperbranched, or dendritic polycation polymer selected from the group consisting of polybiguanide, quaternary ammonium polyethylenimine, quaternary ammonium polypropylenimine, quaternary ammonium polyamidoamine (PAMAM), poly(vinylamine hydrochloride) (PVH), poly(allylamine hydrochloride) (PAH), poly(amidoamine hydrochloride), poly(N-isopropylallylamine hydrochloride), poly(N-tert-butylallylamine hydrochloride), poly(N-1,2-dimethylpropylallylamine hydrochloride), poly(N-methylallylamine hydrochloride), poly(N,N-dimethylallylamine hydrochloride), poly(2-vinylpiperidine hydrochloride), poly(4-vinylpiperidine hydrochloride), poly(diallyldimethylammonium chloride), poly(acrylamide-co-diallyldimethylammonium chloride), poly(diallyl methyl amine hydrochloride), a copolymer of 2-propen-1-amine-hydrochloride with N-2-propenyl-2-propen-1-aminehydrochloride, poly(N-alkyl-4-vinylpyridinium) salt, polylysine, polyornithine, polyarginine, poly(ethylene oxide)-block-poly(vinyl benzyl trimethylammonium chloride), poly(ethylene oxide)-block-poly(1-lysine), poly(2-methacryloyloxyethyl phosphorylcholine methacrylate)-block-poly(vinyl benzyl trimethylammonium chloride), poly[2-(dimethylamino)-ethyl methacrylate, poly[3-(dimethylamino)-propyl methacrylate], poly[2-(dimethylamino)-ethyl methacrylamide], poly[3-(dimethylamino) propyl methacrylamide], poly[2-(trimethylamino)ethyl methacrylate chloride], poly[2-(diethylamino)ethyl methacrylate], poly[2-(dimethylamino) ethyl acrylate], poly(4-vinylpyridine), or combinations thereof.

* * * * *